(12) United States Patent
Kang et al.

(10) Patent No.: US 7,306,271 B2
(45) Date of Patent: Dec. 11, 2007

(54) ALUMINUM BRUSH GUARD ASSEMBLY

(75) Inventors: Paul W. Kang, Rochester Hills, MI (US); Stepan Karpowitsch, Troy, MI (US); Carl L. Smith, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 45 days.

(21) Appl. No.: 11/412,239

(22) Filed: Apr. 26, 2006

(65) Prior Publication Data

US 2007/0252396 A1     Nov. 1, 2007

(51) Int. Cl.
*B60R 19/52* (2006.01)
(52) U.S. Cl. ..................................... 293/115
(58) Field of Classification Search ............... 293/115; 296/193.1; 180/68.6
See application file for complete search history.

(56) References Cited

U.S. PATENT DOCUMENTS

| | | | | |
|---|---|---|---|---|
| 4,322,106 A | * | 3/1982 | Nespor | D12/171 |
| 4,469,360 A | * | 9/1984 | Drury | 293/102 |
| D289,515 S | * | 4/1987 | Wood, Jr. | D12/163 |
| D307,256 S | * | 4/1990 | Holland | D12/171 |
| 5,215,343 A | * | 6/1993 | Fortune | 293/115 |
| 5,326,142 A | * | 7/1994 | Dodds et al. | 293/115 |
| D355,156 S | * | 2/1995 | Davis | D12/163 |
| 5,636,885 A | * | 6/1997 | Hummel | 293/115 |
| D410,879 S | * | 6/1999 | Orth, Sr. | D12/171 |
| 6,022,057 A | * | 2/2000 | Vermeulen | 293/132 |
| D422,952 S | * | 4/2000 | Waagenaar | D12/171 |
| D440,530 S | * | 4/2001 | Geisler | D12/171 |
| 6,290,271 B1 | * | 9/2001 | Geisler | 293/115 |
| 6,318,773 B2 | * | 11/2001 | Storer | 293/115 |
| 6,612,595 B1 | * | 9/2003 | Storer | 293/117 |
| D483,708 S | * | 12/2003 | Roehmer et al. | D12/171 |
| 6,682,111 B1 | * | 1/2004 | Houseman et al. | 293/115 |
| 6,979,016 B1 | * | 12/2005 | Wegener | 293/115 |

* cited by examiner

*Primary Examiner*—Kiran B. Patel

(57) ABSTRACT

A brush guard assembly having left and right wing portions supported by vertical struts attached to the frame of an automotive vehicle, which wing portions have inserts that are attached to upper and lower bar extrusions by screws. The screws are located through the rear of the brush guard assembly so as to not be visible from the front. The wing portions are cast aluminum and the upper and lower bar extrusions are extruded aluminum.

14 Claims, 5 Drawing Sheets

ALUMINUM BRUSH GUARD ASSEMBLY

FIELD OF THE INVENTION

The present invention relates to brush guard assemblies for automotive vehicles. In particular, the present invention relates to aluminum brush guard assemblies for automotive vehicles.

BACKGROUND OF THE INVENTION

Brush guards are used to protect the front of a vehicle from tree branches that can damage the front of the vehicle by breaking head and parking lamp lenses, damaging radiators and scratching exterior surfaces so as to degrade the vehicle's appearance.

In configuring automotive vehicles, there is a continuing effort to reduce fabrication time and costs, as well as to reduce weight, and with respect to visible components, to improve appearance. Brush guards for automotive vehicles having off-road capabilities are currently configured of tubes that are welded to one another. Welding of these tubes consumes fabrication time and increases fabrication costs, while restricting design freedom. A particular design limitation of tubular brush guards is that they have an unfinished look that does not always relate well to refined vehicular designs.

SUMMARY OF THE INVENTION

A brush guard assembly is provided for an automotive vehicle having headlamps and parking lamps wherein the brush guard assembly comprises first and second cast aluminum wing portions and upper and lower bar extrusions. Each wing portion has a first opening for alignment with a parking lamp and a second opening disposed inboard of the first opening for alignment with a headlamp. The upper and lower bar extrusions are coupled to upper and lower locations on the wing portions. Vertical struts are integral with the wing portions and have lower ends with support plates for attachment to the vehicle.

In another aspect of the background assembly, the first and second vertical struts are cast portions that are unitary with the first and second wing portions.

In another aspect of the brush guard assembly, the upper and lower locations of the wing portions are formed as laterally extending inserts that are unitary with the first and second wing portions, respectively, with the upper and lower bar extrusions having openings for receiving the laterally extending inserts therein.

In still another aspect of the brush guard assembly, the wing inserts and the extrusion bars have front and rear sides. There are holes through the rear sides of the wing inserts and rear sides of the extrusion bars for receiving fasteners, such as screws, to couple the extrusion bars to the wing inserts.

In still another aspect of the brush guard assembly, the brush guard assembly preferably is plated with bright nickel-chrome.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
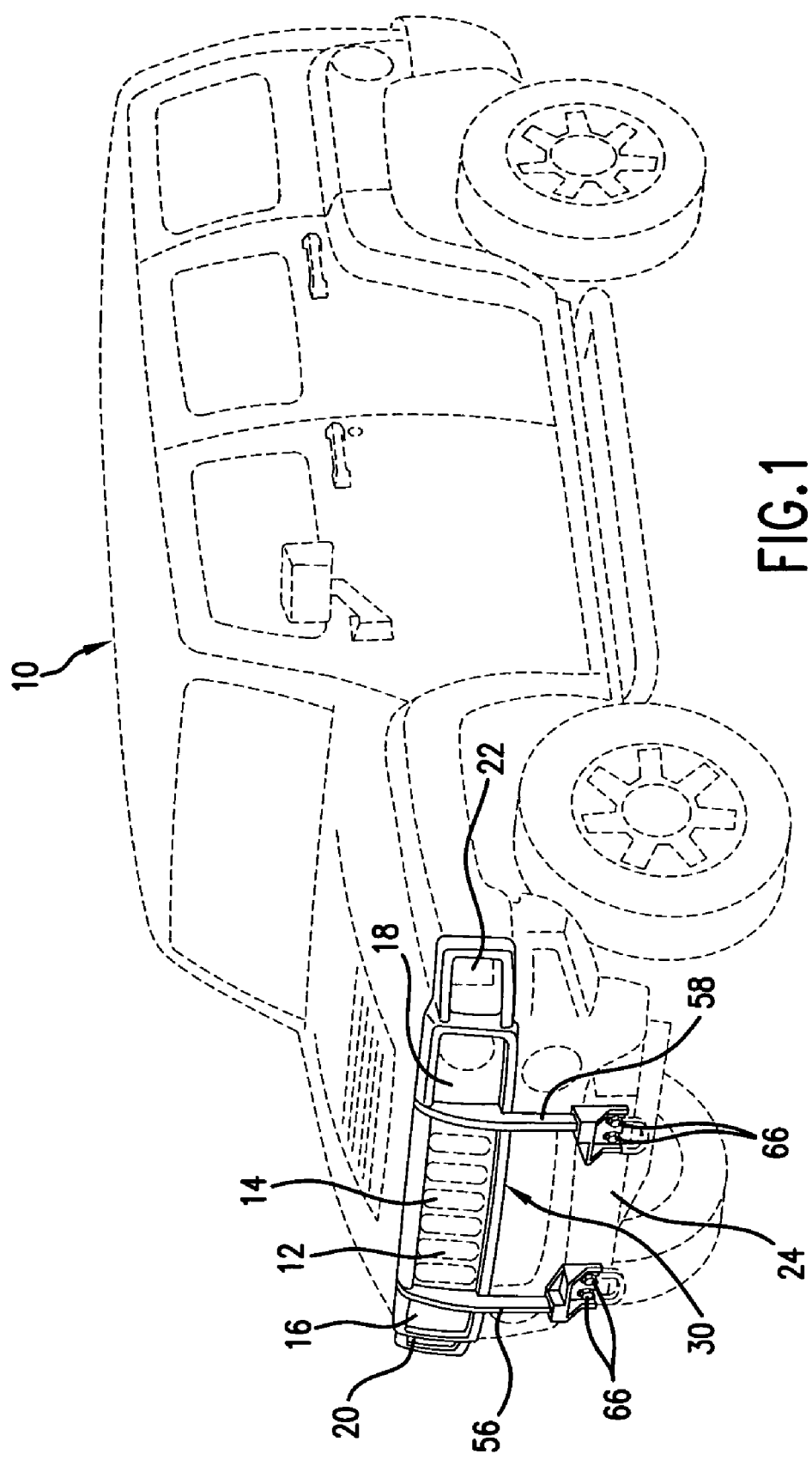
FIG. 1 is a perspective view of a brush guard assembly configured in accordance with the present invention and attached to an automotive vehicle shown in dotted lines.

Referring now to FIG. 1, there is shown an automotive vehicle 10 having a front end 12 with a radiator 14, right and left headlamps 16 and 18 and right and left parking lamps 20 and 22. Secured to the front 12 of the vehicle, at a front portion 24 of the vehicle's frame, is a brush guard assembly 30 configured of aluminum and preferably plated with a layer of bright nickel-chrome. In this disclosure, the terms "left" and "right" are from a vehicle driver's perspective.

Figure 2:
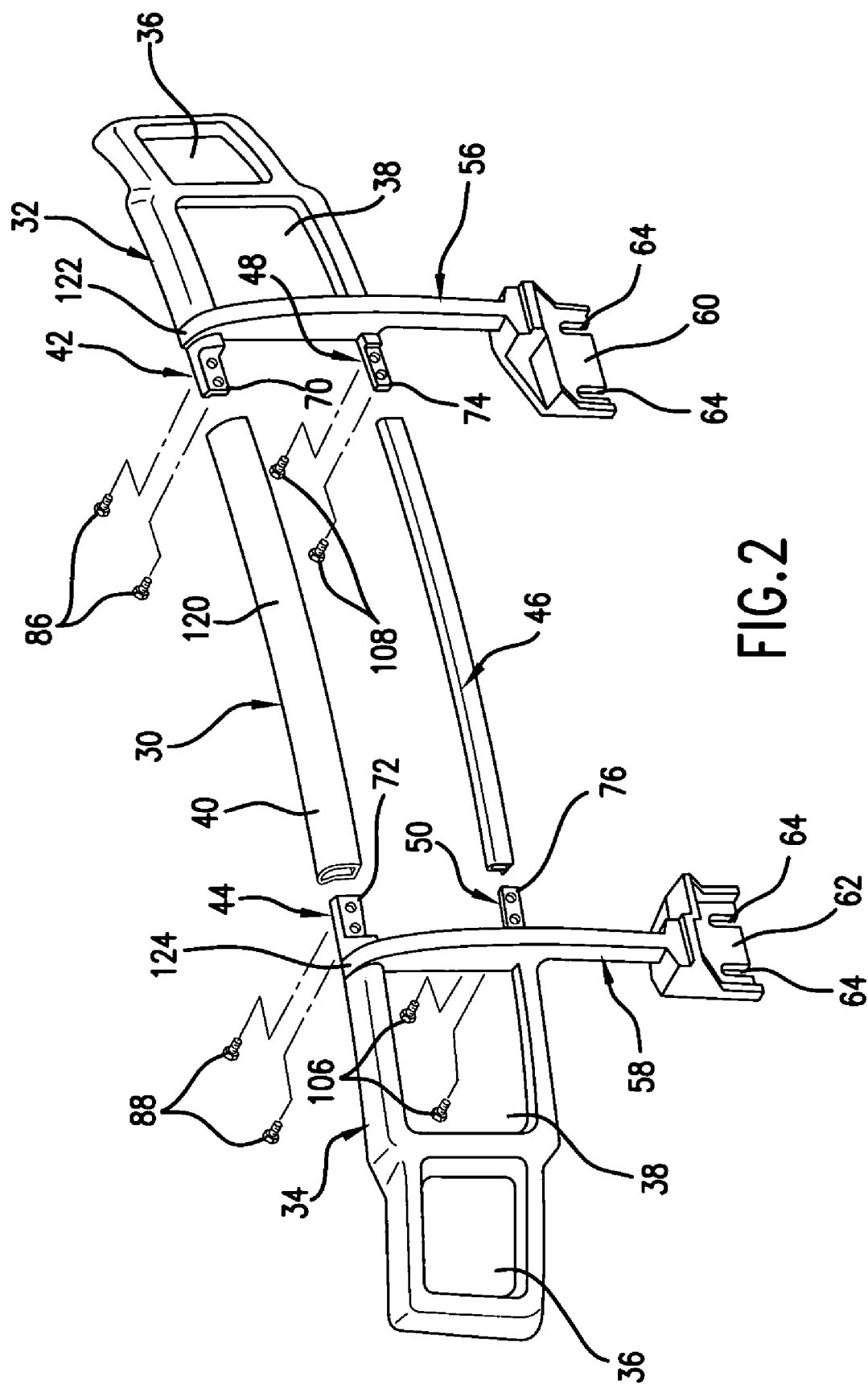
FIG. 2 is an exploded front view, in perspective, of the brush guard assembly of FIG. 1.
Figure 3:
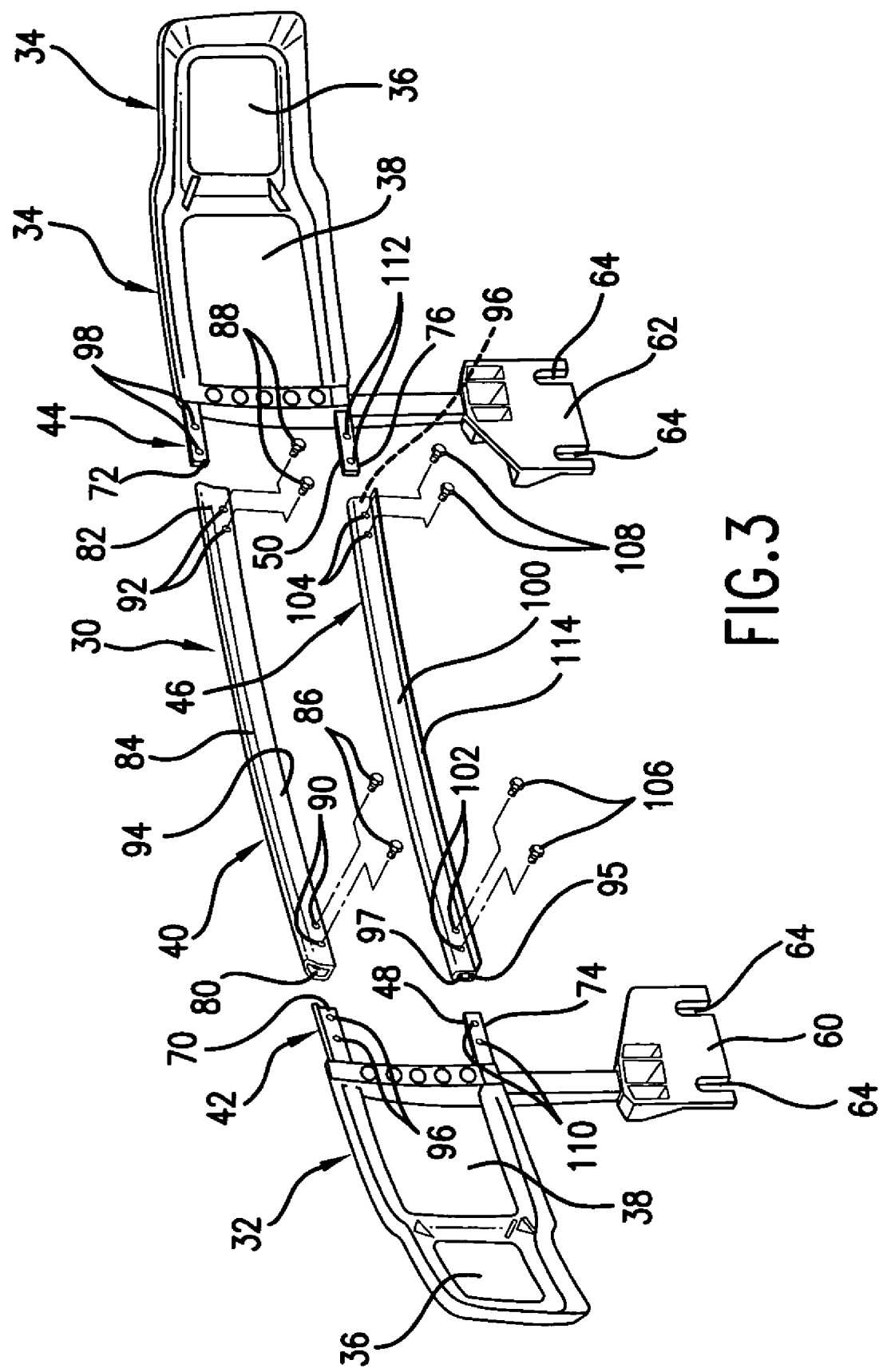
FIG. 3 is a exploded rear view, in perspective, of the brush guard assembly of FIGS. 1 and 2.
Figure 4:
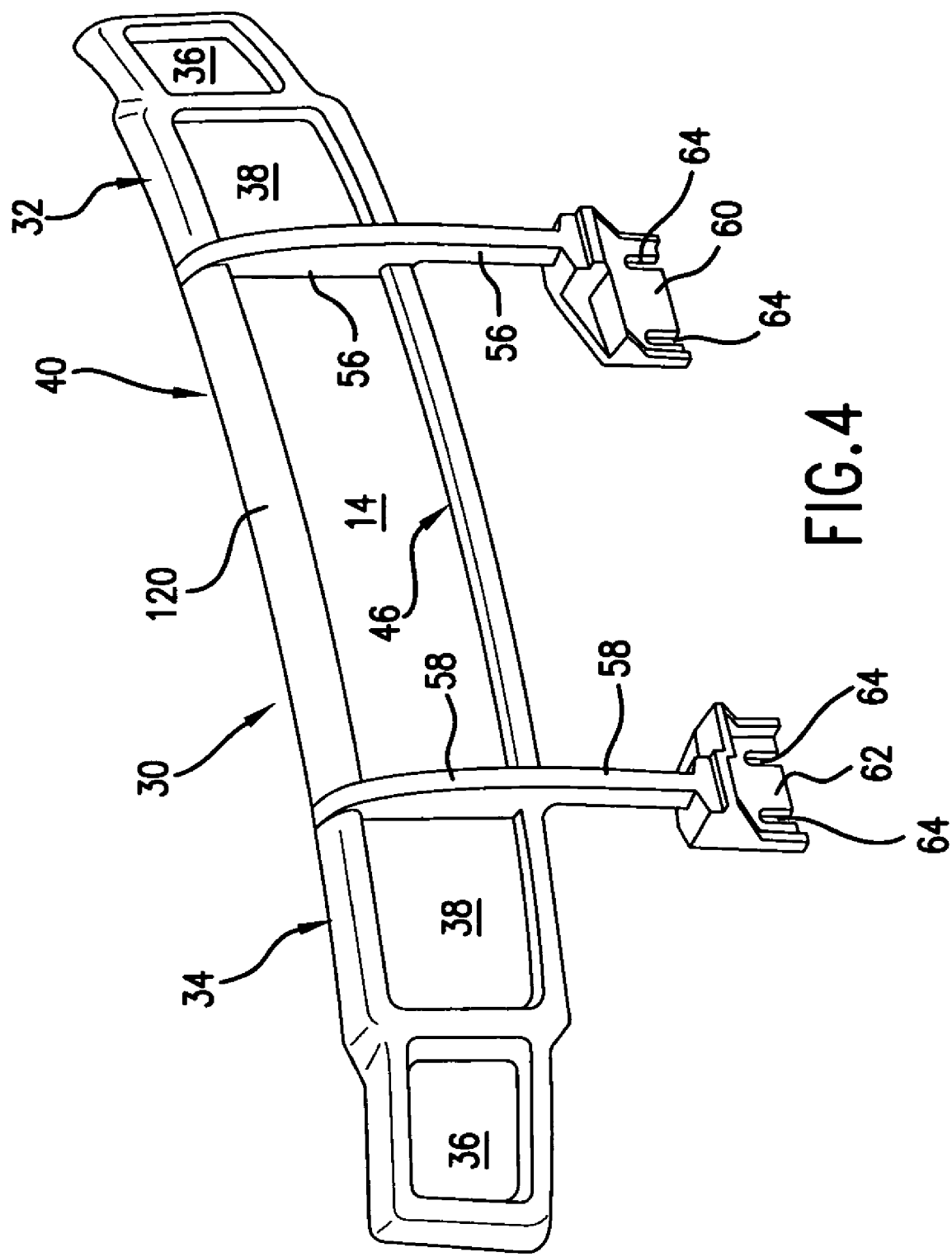
FIG. 4 is a front perspective view of the assembled brush guard assembly of FIGS. 1-3.
Figure 5:
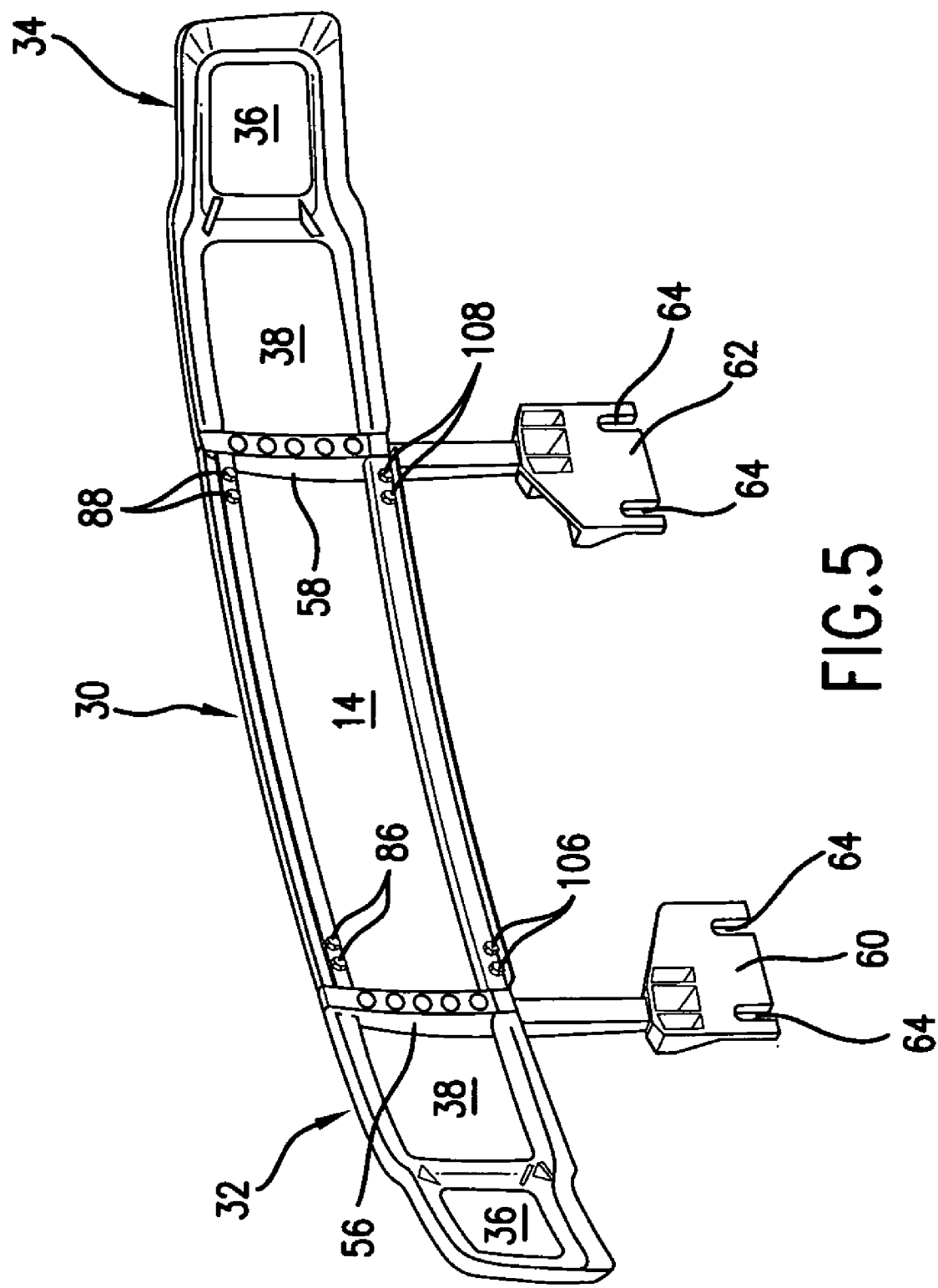
FIG. 5 is a rear perspective view of the assembled brush guard assembly of FIGS. 1-4.

As is seen in FIGS. 2 and 3, the brush guard assembly 30 has left and right wings 32 and 34, respectively. The left and right wings 32 and 34 each have a first opening 36 for alignment with the parking lamps 20 and 22, and each have a second opening 38 that aligns with headlamps 16 and 18. The left and right wing portions 32 and 34 couple to an upper bar extrusion 40 at right and left locations 42 and 44 and to a lower bar extrusion 46 at lower locations 48 and 50. The upper and lower bar extrusions 40 and 46 are preferably tubular or closed extrusions. The left wing portion 32 and right wing portion 34 each have vertical struts 56 and 58 at least integral therewith and preferably unitary therewith, with the struts having attachment plates 60 and 62 for attachment to the front portion 24 of the vehicle frame. The attachment plates 60 and 62 each have vertical slots 64 therein which receive bolts 66 (see FIG. 1) for anchoring the brush guard assembly 30 to the front 24 of the vehicles frame.

Preferably, the wing portions 32 and 34 are permanent mold cast aluminum alloy having an aluminum alloy designation of AA356.0 with a T6 temper. The upper and lower bar closed extrusions 40 and 46 are extruded aluminum alloy designated AA6063 or AA6061 with a T5 temper. Both the wing portions 32 and 34 and bar extrusions 40 and 46 are nickel-chrome plated, preferably bright nickel-chrome plated.

The preferred arrangement for coupling the upper and lower bar extrusions 40 and 46 is to provide the wings 32 and 34 with upper wing inserts 70 and 72 at the locations 42 and 44, respectively, and with lower wing inserts 74 and 76 at lower locations 48 and 50, respectively. The wing inserts 42 and 44 are received in end portions 80 and 82 of a tube 84 defining the upper bar extrusion and pairs of screws 86 and 88 are driven to fasten the upper bar 40 to the wing portions 32 and 34. Since the screws 86 and 88 pass through holes 90 and 92 through the rear side 94 of the upper extrusion bar 40, and thread into threaded holes 96 and 98 in the rear side of wing inserts 42 and 44, respectively, the screws 86 and 88 are not visible from the front of the vehicle 10, nor normally visible from the top or side of the vehicle.

Likewise, the lower bar extrusion 46 is coupled by inserting the wing inserts 74 and 76 at the lower locations 48 and 50 into ends 95 and 96 of a tube 97 defining the lower bar extrusion. The rear surface 100 of the lower bar extrusion 46 has pairs of holes 102 and 104 that receive pairs of screws 106 and 108, respectively. The pairs of screws 106 and 108 are threaded into pairs of threaded holes 110 and 112 in the wing inserts 48 and 50, respectively. Consequently, the screws 106 and 108 are not visible from the front of the vehicle 10, nor normally visible from the top or side of the vehicle. In order to stiffen the lower bar extrusion 46, a rearwardly extending flange 114 projects from the back of the lower bar extrusion and is coextensive therewith.

In the illustrated embodiment, the upper bar extrusion 40 is tubular and quarter-round shaped in cross section so that the top surface 120 is curved to match the curvature 122 and 124 of the vertical struts 56 and 58 that are cast unitary with the left and right wing portions 32 and 34.

From the foregoing description, one skilled in the art can easily ascertain the essential characteristics of this invention, and without departing form the spirit and scope thereof, can make various changes and modifications of the invention to adapt it to various usages and conditions.

We claim:

1. A brush guard assembly for an automotive vehicle having headlamps with a lateral space therebetween and parking lamps outboard of the headlamps, the brush guard comprising:

first and second wing portions of cast aluminum, each wing portion having a first opening for alignment with a parking lamp and a second opening disposed laterally inboard of the first opening for alignment with a headlamp;

a first vertical strut integral with the first wing portion and a second vertical strut integral with the second wing portion, with each vertical strut having a lower end with a support plate for attachment to the vehicle;

an upper bar extrusion extending over the lateral space between the head lamps and having first and second ends coupling with the first and second wing portions at upper locations thereof;

a lower bar extrusion extending over the lateral space between the head lamps and having first and second ends coupling with the first and second wing portions at lower locations thereof, which lower locations are vertically spaced from the upper locations of the upper wing portions;

wherein the first and second vertical struts are cast portions which are unitary with the first and second wing portions; and wherein the upper and lower locations of the wing portions are laterally extending inserts unitary with the first and second wing portions, respectively, and wherein the upper and lower bar extrusions have openings for receiving the laterally extending inserts therein.

2. The brush guard assembly of claim 1 wherein the wing inserts have front and rear sides and the extrusion bars have front and rear sides, and wherein there are holes only through the rear sides of each of the wing portions and rear sides of each of the extrusion bars for 5 receiving fasteners to couple the extrusion bars to the wing portions.

3. The brush guard assembly of claim 2 wherein the fasteners are screws.

4. The brush guard assembly of claim 1 wherein the openings in the extrusion bars are end portions of tubular openings through the extrusion bars.

5. The brush guard assembly of claim 1 wherein each of the support plates at the lower end of each strut have vertically extending slots for receiving bolts to attach the brush guard assembly to the automotive vehicle.

6. The brush guard assembly of claim 1 wherein the brush guard assembly is plated with nickel-chrome.

7. The brush guard assembly of claim 6 where the nickel-chrome is bright nickel-chrome.

8. A brush guard assembly for an automotive vehicle having headlamps with a lateral space therebetween and parking lamps outboard of the headlamps, the brush guard comprising:

first and second wing portions of cast aluminum, each wing portion having a first opening for alignment with a parking lamp and a second opening disposed laterally inboard of the first opening for alignment with a headlamp;

a first vertical strut cast unitary with the first wing portion and a second vertical strut cast unitary with the second wing portion, with each vertical strut having a lower end with a support plate for attachment to the vehicle;

an upper bar extrusion extending over the lateral space between the head lamps and having first and second ends coupling with the first and second wing portions at upper locations thereof;

a lower bar extrusion extending over the lateral space between the head lamps and having first and second ends coupling with the first and second wing portions at lower locations thereof, which lower locations are vertically spaced from the upper locations of the upper wing portions; and nickel-chrome plating over the brush guard assembly;

wherein the upper and lower locations of the wing portions are laterally extending inserts unitary with the first and second wing portions, respectively, and wherein the upper and lower bar extrusions have end openings for receiving the laterally extending inserts therein.

9. The brush guard assembly of claim 8 wherein the wing inserts have front and rear sides and the extrusion bars have front and rear sides, and wherein there are holes only through the rear sides of each of the wing portions extrusion bars for receiving fasteners to couple the extrusion bars to the wing portions.

10. The brush guard assembly of claim 9 wherein the fasteners are screws.

11. The brush guard assembly of claim 8 wherein the openings in the extrusion bars are end portions of tubular openings through the extrusion bars.

12. The brush guard assembly of claim 8 wherein each of the support plates at the lower end of each strut have vertically extending slots for receiving bolts to attach the brush guard to the automotive vehicle.

13. The brush guard assembly of claim 8 wherein the brush guard assembly is plated with nickel-chrome.

14. The brush guard assembly of claim 8 wherein the nickel-chrome is bright nickel-chrome.

* * * * *